Figure 1:
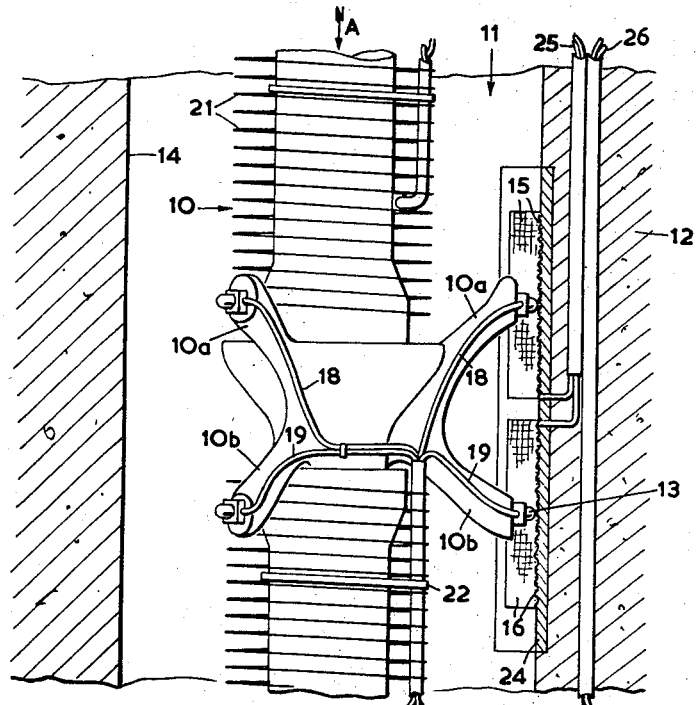
Figure 1:
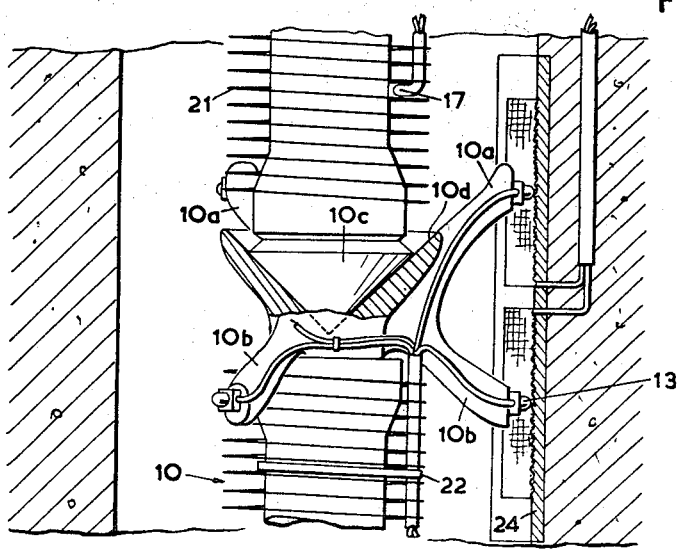

United States Patent Office 2,949,415
Patented Aug. 16, 1960

2,949,415

ELECTRICAL MEASURING MEANS FOR NUCLEAR REACTORS

John Jeffrey Stubbs, Dennis Michael Watts, and Terence Ingham, all of Whetstone, near Leicester, England, assignors to The English Electric Company Limited, London, England, a British company Filed Dec. 26, 1956, Ser. No. 630,608

Claims priority, application Great Britain Dec. 29, 1955

7 Claims. (Cl. 204—193.2)

This invention relates to nuclear reactors of the kind having fuel elements disposed in fuel element channels formed in the moderator structure, and to electrical measuring means for such reactors.

According to the present invention a nuclear reactor includes, in combination, a moderator structure having formed therein a plurality of fuel element channels, a plurality of fuel elements disposed in the respective fuel element channels, at least one of the fuel elements having mounted thereon an electrical measuring device for measuring a desired parameter of the fuel element, two electrical contact devices, and electrical leads connecting the electrical measuring device with the respective contact devices, and for each fuel element carrying an electrical measuring device two electrical contact devices secured in the fuel element channel containing the fuel element and positioned so as to make electrical contact with the respective contact devices on the fuel element, and two electrical conductors secured in the moderator structure, being connected at one end to the respective electrical contact devices fixed in the channel and passing at the other end out of the reactor so as to enable the electrical measuring device to be connected in circuit when desired with electrical measuring apparatus disposed outside the reactor.

According to another feature of the invention the electrical contact devices mounted on a fuel element are spaced axially apart on the fuel element, and the two electrical contact devices secured in a fuel element channel for co-operation with the contact devices on a fuel element comprise two arc-shaped contact members disposed concentrically with the fuel element and spaced axially apart in the fuel element channel.

According to a further feature of the invention each electrical contact device mounted on a fuel element comprises a set of electrical contact members angularly spaced around the fuel element in similar axial positions, and each arc-shaped contact member extends circumferentially only part-way round the fuel element channel, being of a circumferential length such that at least one contact member of the co-operating set makes contact therewith regardless of the angular position of the fuel element in the channel.

According to yet another feature of the invention each fuel element has a plurality of radially-extending spacing members which position the fuel element centrally within a fuel element channel and the electrical contact members mounted on the fuel element are carried on the spacing members.

Preferably the electrical conductors connected with the arc-shaped electrical contact members are embedded in the moderating material constituting the moderator structure and are not exposed in the fuel element channel.

Other features of the invention will appear from the following description, with reference to the accompanying drawings of a graphite-moderated nuclear reactor according to the invention, the fuel elements of this reactor being arranged in vertical fuel element channels formed in the moderator structure.

Figure 1 of the drawings shows a sectional elevation of a part of the graphite pile (constituting the said moderator structure) through which passes a fuel element channel, the section being such as to illustrate clearly the arrangement of the fuel elements disposed in the fuel channel.

Figure 2:
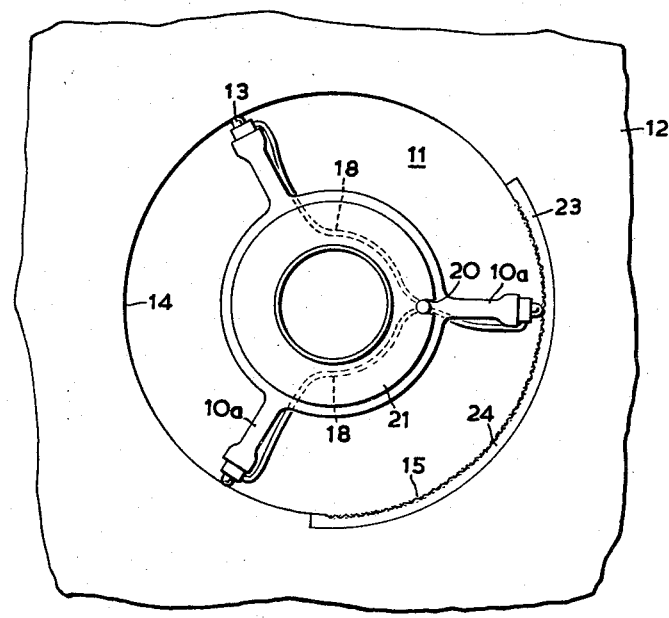

Figure 2 of the drawings shows a view looking in the direction of arrow A of Figure 1.

Referring now to the drawings, Fig. 1 shows three finned fuel elements 10 disposed vertically on end one above the other in the vertical fuel element channel 11. The latter has a circular cross section of diameter greatly exceeding the diameter of the fuel element fins so that a cooling medium may be passed along the channel whereby to cool the fuel elements.

Each fuel element is positioned transversely in the fuel element channel by means of two axially-spaced sets of spacing members $10a$ and $10b$ which radiate from the upper end of each fuel element, the lower end of each fuel element being positioned transversely by means of a cone $10c$ formed thereon which rests in a conical cup $10d$ formed in the upper end of the next lower fuel element.

Each set of spacing members $10a$ and $10b$ comprises three outwardly projecting members which are spaced at equal angles around the fuel element in similar axial positions, the spacing members constituting the upper set being axially in line with the spacing members constituting the lower set. Spring-loaded contacts 13 are mounted at the ends of the spacing members and are arranged to press radially outwards on to the wall 14 bounding the fuel element channel, two of the contacts in so doing pressing against two arc-shaped electrical contact strips 15 and 16 disposed permanently in the wall of the fuel element channel. The spring-loaded contacts are electrically insulated in known manner from the spacing members on which they are mounted, by means not shown, but are electrically connected to the leads of a thermo-couple 17 embedded in the lower part of the fuel element, the contacts on the upper set of spacing members $10a$ being connected in parallel by leads 18 to one of the thermo-couple leads, and the contacts on the lower set of spacing members $10b$ being connected in parallel by leads 19 to the other thermo-couple lead. The thermo-couple leads are located in slots 20 formed in the cooling fins 21 of the fuel element and are maintained in position in the slots by spring clips 22.

The arc-shaped contact strips 15 and 16, two per fuel element, are disposed concentrically with the fuel elements in axially-spaced positions opposite the two sets of spacing members $10a$ and $10b$, and are arranged to extend over arcs of the channel wall subtending angles slightly greater than 120° so that whatever the angular position of the fuel element relative to the fuel element channel at least one of the contacts mounted on the upper set of spacing members $10a$ is in contact with the contact strip 15 and at least one of the contacts mounted on the lower set of spacing members $10b$ is in contact with the contact strip 16. The contact strips 15 and 16 comprise arc-shaped strips of wire gauze disposed in a recess 23 formed in the wall 14 bounding the channel, the contact surface of the gauze being flush with the surface of the wall, and the gauze being set in an insulating material 24 comprising fused magnesia whereby to electrically insulate it from the graphite blocks forming the pile 12. The contact strips 15 and 16 are electrically connected to external thermo-couple terminals (not shown) situated outside the reactor by means of electrical conductors 25 and 26 built into the graphite blocks forming the pile during the process of building the pile. Hence the thermo-couples 17 mounted on the fuel elements 10 may be connected, when desired, in circuit with electrical temperature measuring or indicating apparatus disposed outside the reactor by connecting such apparatus with the external thermo-couple terminals.

The axial spacing of the upper and lower spacing members 10a and 10b and the depth and spacing of the contact strips 15 and 16 are arranged so as to allow for differential thermal expansion between the columns of fuel elements and the reactor pile when in operation.

With the arrangement described, the space between the fuel elements and the channel wall through which the cooling medium flows is devoid of thermo-couple leads, and since the fuel elements have no trailing thermo-couple leads the removal and insertion of the fuel elements is rendered a less difficult task than heretofore. Furthermore, since the thermo-couples mounted on the fuel elements will be connected to external terminals whatever the angular position of fuel elements relative to the fuel element channel, there is no necessity to align the fuel elements in any particular angular position when inserting them in the pile.

In the case of a liquid-moderated nuclear reactor of the kind in which the fuel elements are disposed within tubes immersed in the liquid moderator the electrical contacts mounted on the fuel elements make electrical contact with electrical contacts such as 15 and 16 mounted in a manner similar to the described in the walls of the tubes and electrically connected to external thermo-couple terminals by means of conductors embedded in the walls of the tubes.

Other electrical devices mounted on the fuel elements and arranged for measuring other physical quantities electrically may be connected with external terminals disposed outside the reactor by means similar to those described above for connecting the thermo-couples with external terminals.

What we claim as our invention and desire to secure by Letters Patent is:

1. In a nuclear reactor including, in combination, a moderator structure having formed therein a plurality of fuel element channels and a plurality of fuel elements disposed in the respective fuel element channels, the provision of at least one fuel element having mounted thereon an electrical measuring device for measuring a desired parameter of the fuel element, two electrical contact devices, and electrical leads connecting the electrical measuring device with the respective contact devices, and for each fuel element carrying an electrical measuring device two electrical contact devices secured in the fuel element channel containing the fuel element and positioned so as to make electrical contact with the respective contact devices on the fuel element, and two electrical conductors secured in the moderator structure, being connected at one end to the respective electrical contact devices fixed in the channel and passing at the other end out of the reactor so as to enable the electrical measuring device to be connected in circuit when desired with electrical measuring apparatus disposed outside the reactor.

2. In a nuclear reactor according to claim 1, wherein the electrical contact devices mounted on a fuel element are spaced axially apart on the fuel element, and the two electrical contact devices secured in a fuel element channel for co-operation with the contact devices on a fuel element comprise two arc-shaped contact members disposed concentrically with the fuel element and spaced axially apart in the fuel element channel.

3. In a nuclear reactor according to claim 2, wherein each electrical contact device mounted on a fuel element comprises a set of electrical contact members angularly spaced around the fuel element in similar axial positions, and wherein each arch-shaped contact member extends circumferentially only part-way round the fuel element channel, being of a circumferential length such that at least one contact member of the co-operating set makes contact therewith regardless of the angular position of the fuel element in the channel.

4. In a nuclear reactor according to claim 3, wherein the electrical contact members mounted on a fuel element exert radial pressure on the arc-shaped contact members in the fuel element channel.

5. In a nuclear reactor according to claim 3, wherein each fuel element has a plurality of radially-extending spacing members which position the fuel element centrally within a fuel element channel and wherein the electrical contact members mounted on the fuel element are carried on the spacing members.

6. In a nuclear reactor according to claim 3, wherein each arc-shaped electrical contact member mounted in a fuel element channel comprises a strip of wire gauze mounted with its contact surface flush with the wall of the fuel element channel and being supported by an electrically insulating material embedded in the fuel element channel wall.

7. In a nuclear reactor according to claim 3, wherein the electrical conductors connected with arc-shaped electrical contact members are embedded in the moderating material constituting the moderator structure and are not exposed in the fuel element channel.

References Cited in the file of this patent

FOREIGN PATENTS 547,840    Great Britain _____ Sept. 14, 1942

OTHER REFERENCES

U.S. Atomic Energy Commission TID–5275, Research Reactors, Library date Oct. 10, 1955, pp. 367, 422. Available from AEC Technical Information Service, Oak Ridge, Tenn.

Proceedings of the International Conference on the Peaceful Uses of Atomic Energy, vol. 2, held in Geneva August 20, 1955. (Library received copy Feb. 27, 1956. United Nations, N.Y. 1956, pp. 284, 311, 460.)